US007898695B1

(12) United States Patent
Damon et al.

(10) Patent No.: US 7,898,695 B1
(45) Date of Patent: Mar. 1, 2011

(54) METHOD OF COMPENSATING FOR ELECTRONIC PRINTHEAD SKEW AND BOW CORRECTION IN AN IMAGING MACHINE TO REDUCE PRINT ARTIFACTS

(75) Inventors: Brian Wesley Damon, Lexington, KY (US); Shaun Timothy Love, Lexington, KY (US); Cary Patterson Ravitz, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 3025 days.

(21) Appl. No.: 09/685,052

(22) Filed: Oct. 6, 2000

(51) Int. Cl.
G06T 5/00 (2006.01)
H04N 1/407 (2006.01)
H04N 1/409 (2006.01)

(52) U.S. Cl. ......................................................... 358/3.26
(58) Field of Classification Search .................... 358/1.9, 358/462, 496–498, 488, 3.26; 382/151, 176
See application file for complete search history.

(56) References Cited

U.S. PATENT DOCUMENTS

| 4,370,641 A | 1/1983 | Kantor et al. |
| 4,428,667 A | 1/1984 | Phelps et al. |
| 4,511,242 A | 4/1985 | Ashbee et al. |
| 4,953,230 A * | 8/1990 | Kurose .......................... 382/290 |
| 4,994,864 A | 2/1991 | Schieck et al. |
| 5,093,674 A | 3/1992 | Storlie |
| 5,138,339 A | 8/1992 | Curry et al. |
| 5,181,260 A | 1/1993 | Kurosu et al. |
| 5,185,673 A | 2/1993 | Sobol |
| 5,187,528 A | 2/1993 | Nishikawa et al. |
| 5,187,753 A | 2/1993 | Bloomberg et al. |
| 5,226,741 A | 7/1993 | Kumazaki et al. |
| 5,233,168 A | 8/1993 | Kulik |
| 5,266,976 A | 11/1993 | Ohigashi et al. |
| 5,278,625 A | 1/1994 | Charnitski et al. |
| 5,287,162 A | 2/1994 | de Jong et al. |
| 5,300,961 A | 4/1994 | Corona et al. |
| 5,327,165 A | 7/1994 | Elliott |
| 5,353,044 A | 10/1994 | Nakano et al. |
| 5,355,420 A | 10/1994 | Bloomberg et al. |
| 5,357,273 A | 10/1994 | Curry |
| 5,363,127 A | 11/1994 | Andrews |
| 5,367,381 A | 11/1994 | Curry |
| 5,373,355 A | 12/1994 | Ando et al. |

(Continued)

FOREIGN PATENT DOCUMENTS

JP         090018694         1/1995

OTHER PUBLICATIONS

"Principles of Color Technology", Roy S. Berns, copyright 2000, John Wiley & Sons, pp. 170-174.*

*Primary Examiner* — James A Thompson

(57) ABSTRACT

A method for reducing the occurrence of print artifacts in an imaging machine includes the steps of applying an electronic printhead skew correction to image data corresponding to at least one of a plurality of image planes, e.g., of a cyan image plane, a magenta image plane, a yellow image plane and a black image plane, to generate skew corrected image data. Thereafter the associated halftone screens are modified to eliminated halftone noise introduced by the electronic printhead skew correction. If text characters are present, block boundaries are effectively shifted to reside in the spaces between adjacent text characters.

13 Claims, 7 Drawing Sheets

U.S. PATENT DOCUMENTS

| | | | |
|---|---|---|---|
| 5,404,202 A | 4/1995 | Abramsohn | |
| 5,418,604 A | 5/1995 | Nagakura et al. | |
| 5,430,472 A | 7/1995 | Curry | |
| 5,434,956 A | 7/1995 | Son et al. | |
| 5,442,388 A | 8/1995 | Schieck | |
| 5,452,073 A | 9/1995 | Kataoka | |
| 5,452,374 A | 9/1995 | Cullen et al. | |
| 5,473,984 A | 12/1995 | Terrell, Jr. et al. | |
| 5,485,289 A | 1/1996 | Curry | |
| 5,497,180 A * | 3/1996 | Kawakami et al. | 347/131 |
| 5,506,918 A | 4/1996 | Ishitani | |
| 5,563,403 A | 10/1996 | Bessho et al. | |
| 5,587,771 A * | 12/1996 | Mori et al. | 399/72 |
| 5,594,817 A | 1/1997 | Fast et al. | |
| 5,600,117 A | 2/1997 | Sakamoto | |
| 5,613,016 A | 3/1997 | Saitoh | |
| 5,662,321 A | 9/1997 | Borostyan et al. | |
| 5,689,425 A | 11/1997 | Sainio et al. | |
| 5,719,680 A * | 2/1998 | Yoshida et al. | 358/296 |
| 5,732,162 A | 3/1998 | Curry | |
| 5,739,841 A | 4/1998 | Ng et al. | |
| 5,748,330 A * | 5/1998 | Wang et al. | 358/3.21 |
| 5,751,305 A | 5/1998 | Hadley | |
| 5,751,311 A | 5/1998 | Drake | |
| 5,764,254 A | 6/1998 | Nicoloff, Jr. et al. | |
| 5,778,103 A | 7/1998 | Allan et al. | |
| 5,778,280 A | 7/1998 | Komiya et al. | |
| 5,781,660 A | 7/1998 | Nitta et al. | |
| 5,782,184 A | 7/1998 | Albertalli et al. | |
| 5,790,696 A | 8/1998 | Takahashi | |
| 5,818,501 A | 10/1998 | Ng et al. | |
| 5,821,969 A | 10/1998 | Koshi et al. | |
| 5,822,454 A | 10/1998 | Rangarajan | |
| 5,828,925 A | 10/1998 | Yoshizawa | |
| 5,835,241 A * | 11/1998 | Saund | 358/488 |
| 5,841,458 A * | 11/1998 | Kroon | 347/131 |
| 5,854,854 A * | 12/1998 | Cullen et al. | 382/176 |
| 5,872,586 A | 2/1999 | Shio | |
| 5,889,534 A | 3/1999 | Johnson et al. | |
| 5,946,537 A | 8/1999 | Nakayasu et al. | |
| 5,956,055 A | 9/1999 | Gibson et al. | |
| 5,963,767 A | 10/1999 | Habets et al. | |
| 5,978,561 A | 11/1999 | Kimura et al. | |
| 6,052,552 A | 4/2000 | Ohsumi et al. | |
| 6,327,385 B1 * | 12/2001 | Kamitani | 382/177 |

* cited by examiner

US 7,898,695 B1

METHOD OF COMPENSATING FOR ELECTRONIC PRINTHEAD SKEW AND BOW CORRECTION IN AN IMAGING MACHINE TO REDUCE PRINT ARTIFACTS

BACKGROUND OF THE INVENTION

1. Field of the Invention

The present invention relates to printhead skew correction in an electrophotographic machine, and more particularly, to a method of compensating for electronic printhead skew correction in an electrophotographic machine, such as a laser printer, to reduce the occurrence of undesirable print artifacts.

2. Description of the Related Art

In an in-line color electrophotographic imaging process, latent images are formed on a plurality of photosensitive drums, which are in turn developed using a predetermined color of toner. The developed images are then transferred to a sheet of media (such as paper) which travels past the drums. The image in each color is created one line at a time, and the lines are oriented at right angles to the direction of travel of the sheet of media. The individually-generated images combine to form a full-color image. In a typical multi-color laser printer, for example, the sheet of media passes through four color developing stations in series, with the colors being black, magenta, cyan and yellow.

It is recognized that in order for the multi-color laser printer to print accurately, the laser beams for all four colors must be in alignment, both in the scan direction (across the page) and the process direction (feed direction of the print medium). However, providing proper alignment of even a single laser printhead in relation to the sheet of media in the process direction can be difficult. This problem is compounded with the addition of each printhead, since the plurality of printheads must be in registration so that the individual images generated by each printhead can be superimposed correctly when combined. During printer assembly an attempt is made to optically align the laser printheads both individually and collectively, but the ability to provide precise alignment is limited by several factors, including component tolerances. In addition, it is possible for a precisely aligned printing system to drift out of alignment over time due to component aging and ambient environmental factors, such as printing temperature.

What is needed in the art is a method of providing electronic printhead skew correction to compensate for alignment errors remaining after initial printhead alignment, while providing compensation to reduce undesirable print artifacts that can be created by applying the electronic printhead skew correction.

SUMMARY OF THE INVENTION

The present invention provides electronic printhead skew and bow correction to compensate for alignment errors remaining after initial printhead alignment, while providing compensation to reduce undesirable print artifacts that can be created by applying electronic printhead skew correction.

In one method of the invention, electronic printhead skew correction is applied to image data corresponding to at least one of a plurality of image planes to generate skew corrected image data. In addition to the step of applying electronic printhead skew correction, the associated halftone screen is modified to eliminate halftone noise introduced by the electronic printhead skew correction.

In another aspect of the invention, prior to the step of applying the associated halftone screen, text characters are added to the skew corrected image data to form a composite bit map. The composite bit map is divided into a plurality of blocks. A vertical centerline of each of the text characters is identified and associated with a respective one of the plurality of blocks. An entirety of each of the text characters is shifted by a skew correction factor that is associated with the respective one of the plurality of blocks.

An advantage of the present invention is that the printing resulting from a skewed printhead having benefited from electronic skew correction can more closely approximate the printing results obtained if the printhead had originally had no skew.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate preferred embodiments of the invention, and such exemplifications are not to be construed as limiting the scope of the invention in any manner.

DETAILED DESCRIPTION OF THE INVENTION

Figure 1:
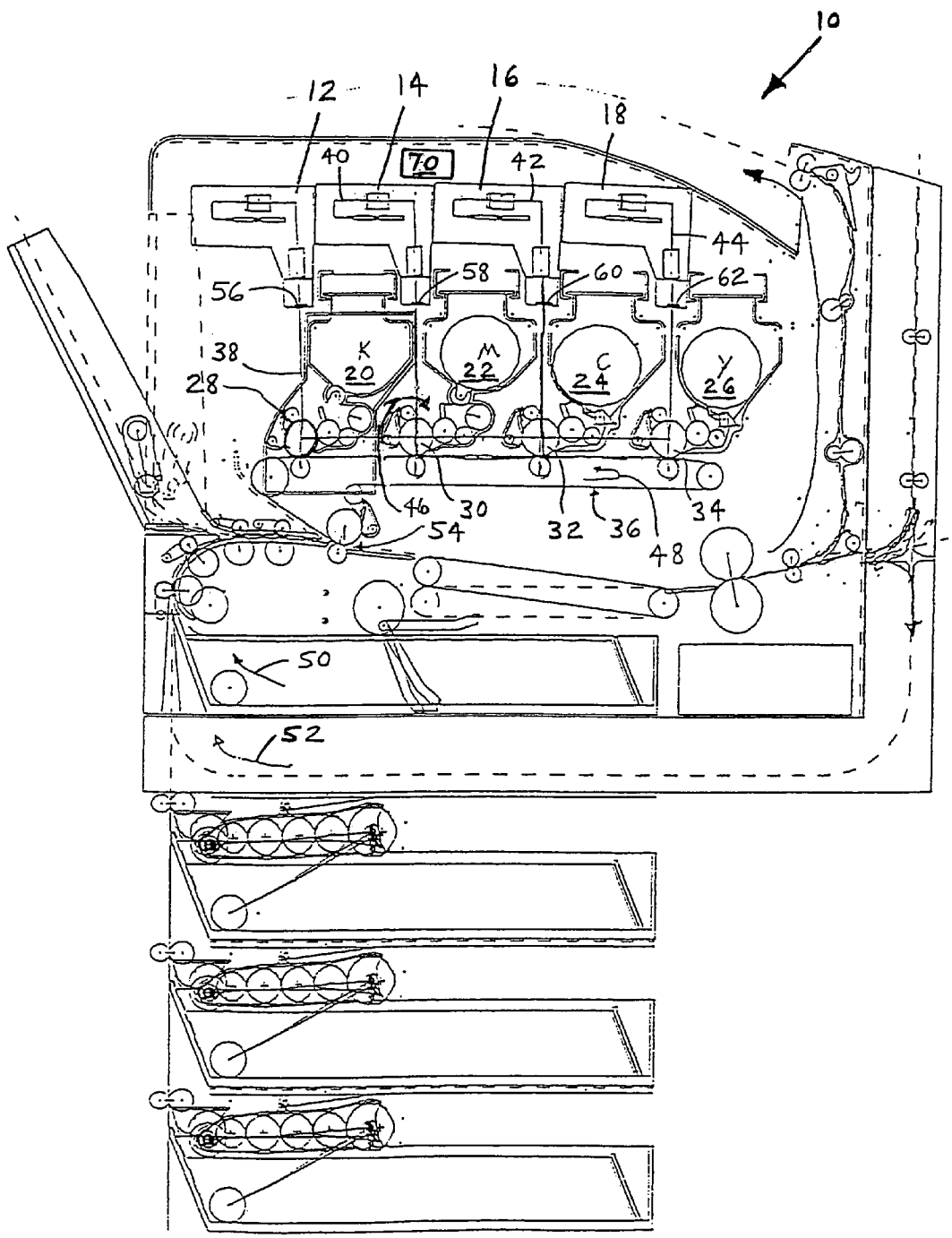
FIG. 1 is a side, sectional view of a multicolor laser printer embodying the present invention.

Referring now to the drawings and, more particularly, to FIG. 1, there is shown one embodiment of a multicolor laser printer 10 including laser printhead units 12, 14, 16, 18, a black toner cartridge 20, a magenta toner cartridge 22, a cyan toner cartridge 24, a yellow toner cartridge 26, photoconductive drums 28, 30, 32, 34, and an intermediate transfer member belt 36.

Each of laser printhead units 12, 14, 16 and 18 scans a respective laser beam 38, 40, 42, 44 in a scan direction, perpendicular to the plane of FIG. 1, across a respective one of photoconductive drums 28, 30, 32 and 34. Each of photoconductive drums 28, 30, 32 and 34 is negatively charged to approximately −900 volts and is subsequently discharged to a level of approximately −200 volts in the areas of its peripheral surface that are impinged by a respective one of laser beams 38, 40, 42 and 44 to form a latent image thereon made up of a plurality of dots, or pels. During each scan of a laser beam across a photoconductive drum, each of photoconductive drums 28, 30, 32 and 34 is continuously rotated, clockwise in the embodiment shown, in a process direction indicated by direction arrow 46. The scanning of laser beams 38, 40, 42 and 44 across the peripheral surfaces of the photoconductive drums is cyclically repeated, thereby discharging the areas of the peripheral surfaces on which the laser beams impinge.

The toner in each of toner cartridges 20, 22, 24 and 26 is negatively charged to approximately −600 volts. Thus, when the toner from cartridges 20, 22, 24 and 26 is brought into contact with a respective one of photoconductive drums 28, 30, 32 and 34, the toner is attracted to and adheres to the portions of the peripheral surfaces of the drums that have been discharged to −200 volts by the laser beams. As belt 36 rotates in the direction indicated by arrow 48, the toner from each of drums 28, 30, 32 and 34 is transferred to the outside surface of belt 36. As a print medium, such as paper, travels along either path 50 or duplexing path 52, the toner is transferred to the surface of the print medium in nip 54.

Each of printhead units 12, 14, 16 and 18 includes a respective one of sensor devices 56, 58, 60 and 62, each of which is placed near the end of a scan line of the associated laser beam, and is used to determine an orientation of the laser printhead in the process direction. Also, the operation of each of printhead units 12, 14, 16 and 18 is controlled by a printhead controller 70. Printhead controller 70 includes microprocessor and data signal processing modules, such as a raster image processor (RIP), for processing print data received from a source computer (not shown).

In addition, printhead controller 70 includes modules for processing sensor information received from each of sensor devices 56, 58, 60 and 62 and for determining whether the orientation of any of printhead units 12, 14, 16 and 18 is skewed in relation to an ideal scan path having no skew. If it is determined that the orientation of one or more of printhead units 12, 14, 16, 18 is skewed, electronic printhead skew correction, as more fully described below, is effected to compensate for the alignment errors relating the alignment of the skewed printhead, and further compensation, also described more fully below, is provided to reduce undesirable print artifacts that can be created as a result of applying the electronic printhead skew correction.

Figure 2:
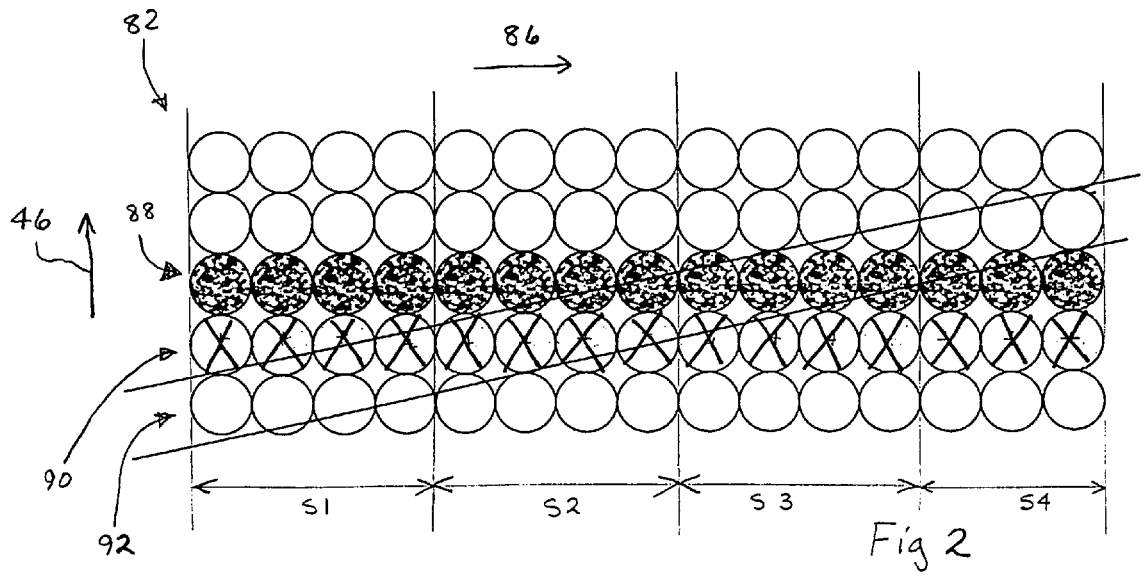
FIG. 2 graphically depicts an original bit map for one image plane, in relation to a skewed laser beam scan path.
Figure 3:
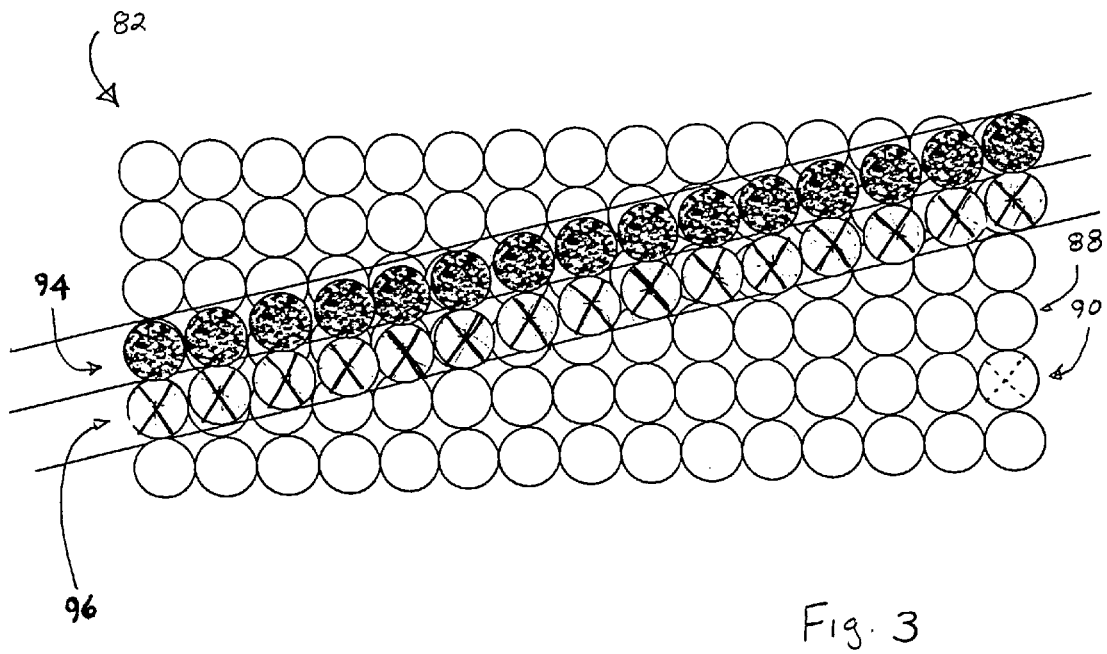
FIG. 3 graphically illustrates the results of printing the data of the original bit map of FIG. 2 along the skewed laser beam path.

FIG. 2 graphically illustrates an original image plane bitmap 82 of one of the black, cyan, magenta and yellow image planes of multicolor laser 10. Original image plane bitmap 82 includes a plurality of rows and a plurality of columns of potential pel locations to be developed on an associated photoconductive drum. The open circles depict pels which will not be printed. Each of the columns of potential pel locations illustratively represents a printable portion of the image plane which extends in process direction 46. Each row of potential pel locations illustratively represent a printable portion of the image plane which is to be scanned across the width of the associated photoconductive drum in a scan direction depicted by arrow 86, which is ideally perpendicular to the process direction 46. In the illustration of FIG. 3, the pels which are actually to be printed are depicted by darkened circled and by circles with an "X" therein (hereinafter Xed pels). The darkened pels are located along row 88 of the original image plane bitmap 82 and the Xed pels are located along row 90 of the original image plane bitmap 82. Thus, the development of the associated one of photoconductive drums 28, 30, 32, 34 containing the original image plane bitmap 82 would ideally result in a horizontal line two pets wide which extends across the width of the associated photoconductive drum perpendicular to process direction 46.

FIG. 2 further graphically illustrates a scan path 92 for an associated one of laser beams 38, 40, 42, 44. Scan path 92 is shown to overlie the original image plane bitmap 82, and extends generally diagonally across four rows of the original image plane bitmap 82. Since the orientation of scan path 92 does not correspond exactly to the orientation of the rows of image plane bitmap 82, scan path 92 is said to be skewed. The skewed path 92 corresponds to a laser beam path which would be traveled as a result of a skewed printhead which is in need of skew correction. As illustrated in FIG. 2, the skew angle of scan path 92 is positive, and requires negative skew correction:

FIG. 3 graphically illustrates the results of scanning the data of rows 88 and 90 of the original image plane bitmap 82 onto the associated one of photoconductive drums 28, 30, 32, 34 with a skewed printhead along the scanlines 94 and 96. Scan lines 94, 96 have an orientation which correspond to the orientation of scan path 92 of FIG. 2. As shown in FIG. 3, the amount of skew can be described in terms of the maximum deviation of a printed pel position from the intended pel position. For example, in the illustration of FIG. 3, the rightmost pels of scan lines 94, 96 are off-set from the intended position at rows 88, 90 of image plane bitmap 82 by 3 pels. Thus, the skewed printhead is said to have a skew of 3.

If, for example, printhead unit 12 is skewed as illustrated in FIG. 3, and printhead units 14, 16, 18 are aligned to exactly print an original bit map of the corresponding cyan, magenta and yellow image planes, then the orientation of printhead 12 cannot be registered with the orientation of printhead units 14, 16, 18. As a result, the individual images generated by each of printhead units 12, 14, 16, 18 will not be superimposed correctly when combined. Accordingly, it is desirable to perform skew correction of printhead unit 12 so that the data printed by the skewed printhead unit 12 will be more closely aligned with the intended pel positions of the original image plane bitmap 82. In implementing electronic printhead skew correction, the scan path of a skewed printhead will not be physically changed. Rather, the scan path is virtually changed electronically by changing the order in which print data is supplied to the skewed printhead. Thus, to correct printhead skew, the present invention generates a modified bitmap image from the original bit map image of original image plane bitmap 82, and the modified bitmap image is used to control the operation of the skewed printhead 12.

Figure 4:
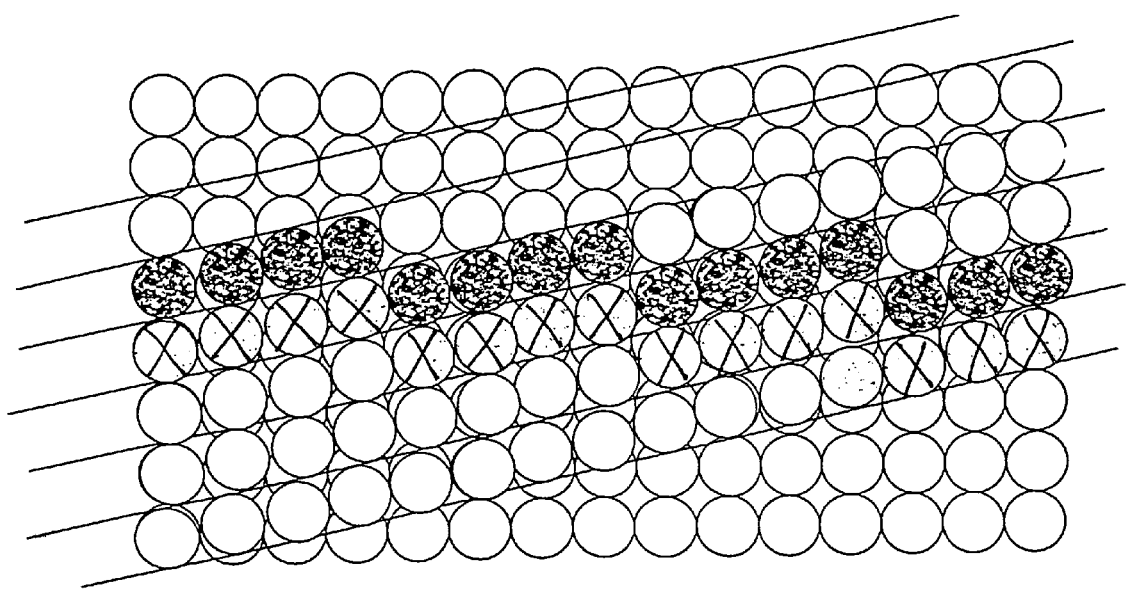
FIG. 4 graphically illustrates the results of implementing electronic printhead skew correction in printing a skew correction bit map.

FIG. 4 graphically illustrates the general principles of electronic printhead skew correction. First, the magnitude of the skew in pels is determined. As illustrated in FIG. 3, the skew magnitude (SM) of the present example is 3 pels. Therefore, the original image plane bitmap 82 must be shifted by an amount of up to 3 pels in order to more closely correspond to the intended pel positions. To correct the skew of the printhead unit 12, each row of the original image plane bitmap 82 is divided into a number of segments greater than the magnitude of the skew. The total number of segments (SG) is determined by the formula: SG=SM+1. Once the rows of the original image plane bitmap 82 are segmented (see FIG. 2), then it is determined whether to shift the data within a given segment to a new row by a predetermined correction factor (CF).

Referring now to FIGS. 2 and 3 in relation to FIG. 4, it can be seen that for a skew magnitude SM=3, the rows of original image plane bitmap 82 are segmented into 4 segments (SG=4). Referring to FIG. 4, in forming a skew correction bit map for printhead unit 12, the data corresponding to segment S1 of the original image plane bitmap 82 is not shifted (CF=0); in segment S2, the original image plane bitmap 82 is shifted by one row (CF=1); in segment S3 the original image plane bitmap 82 is shifted by two rows (CF=2); and in segment S4 the original image plane bitmap 82 is shifted by three rows (CF=3).

In an actual printer, such as a Lexmark color laser printer, the raster image processor (RIP) software divides the rows of the original bit map image of each color plane into 10 blocks (i.e. segments) of data. Since the skew correction method described above permits a maximum skew magnitude SM of one less than the number of segments SG (i.e., SM=SG−1), the current Lexmark block arrangement permits a maximum skew correction of nine (SM=9) in implementing the method described above. The correction factor CF for a given skew magnitude (SK=1 to 9) for each of the blocks (S=1 to 10) can be acquired by the formula:

$$CF(SK, S)=(SW*(S-1))/(SL/(SK+1))+X, \text{ rounded down to the nearest integer,}$$

wherein: SW is the width of each block (segment) in pels;
S is the number of the block (segment) under consideration;
SL is the scan length of a full row of original bit map in pels;
SK is the skew magnitude in pels; and
X is a skew and bow offset.

The skew and bow offset, X, can be any value, including 0. The formula set forth above could be executed in real time to provide skew correction, as needed, to each bit of the original bit map in generating a modified bit map with skew correction. However, a more efficient approach is to use the formula above to generate a look-up table (see, Table 1 below) which includes the values for the skew correction factor CF for each combination of skew magnitude (S=1 to 9) and block (S=1 to 10).

TABLE 1

| Skew Correction Factors | | | | | | | | | | |
|---|---|---|---|---|---|---|---|---|---|---|
| Magnitude Of Skew | SEGMENT | | | | | | | | | |
| (SK) | S1 | S2 | S3 | S4 | S5 | S6 | S7 | S8 | S9 | S10 |
| 0 | 0 | 0 | 0 | 0 | 0 | 0 | 0 | 0 | 0 | 0 |
| 1 | 0 | 0 | 0 | 0 | 0 | 1 | 1 | 1 | 1 | 1 |
| 2 | 0 | 0 | 0 | 0 | 1 | 1 | 1 | 2 | 2 | 2 |
| 3 | 0 | 0 | 0 | 1 | 1 | 2 | 2 | 2 | 3 | 3 |
| 4 | 0 | 0 | 1 | 1 | 2 | 2 | 3 | 3 | 4 | 4 |
| 5 | 0 | 0 | 1 | 1 | 2 | 3 | 3 | 4 | 4 | 5 |
| 6 | 0 | 0 | 1 | 2 | 2 | 3 | 4 | 4 | 5 | 6 |
| 7 | 0 | 0 | 1 | 2 | 3 | 4 | 4 | 5 | 6 | 7 |
| 8 | 0 | 0 | 1 | 2 | 3 | 4 | 5 | 6 | 7 | 8 |
| 9 | 0 | 1 | 2 | 3 | 4 | 5 | 6 | 7 | 8 | 9 |

As illustrated in FIG. 4, the electronic printhead skew correction method described above provides generally acceptable skew correction results. However, if the electronic printhead skew correction is performed on data of an image bit map in the later stages of image processing, undesirable visual artifacts may be created, as more fully described below.

Generally, printhead controller 70 of printer 10 receives image data from a host computer in a compact high level language, such as a PostScript file. The high level language data is passed through an image processor, such as an interpreter, which converts the high level language data into bit-map data for each of the color planes of the printer. Since printer 10 cannot print continuous tone data, a halftone screening module converts continuous tone images to halftone screened images. During halftoning, a halftone grid is made to overlay the image plane of contone data, i.e., bytemap, of interest to effectively generate a halftoned bit map of the image plane of interest, so as to allow for shade variations of the color by turning on only a certain percentage of the total number of pels. The continuous tone data at each pel (or pixel) is compared to a corresponding threshold value contained in the halftone grid. A corresponding dot in the halftoned bitmap is turned on only if the continuous tone data value exceeds the threshold value. The resulting halftoned bitmap is then serialized to the printhead.

It has been discovered that if the electronic printhead skew correction occurs late in the imaging process, such as for example following halftoning, or after text is added to an image, then undesirable print artifacts can be created due to image distortion caused by the electronic printhead skew correction. The present invention, however, provides further compensation to reduce the adverse visual impact of these print artifacts.

Figure 5:
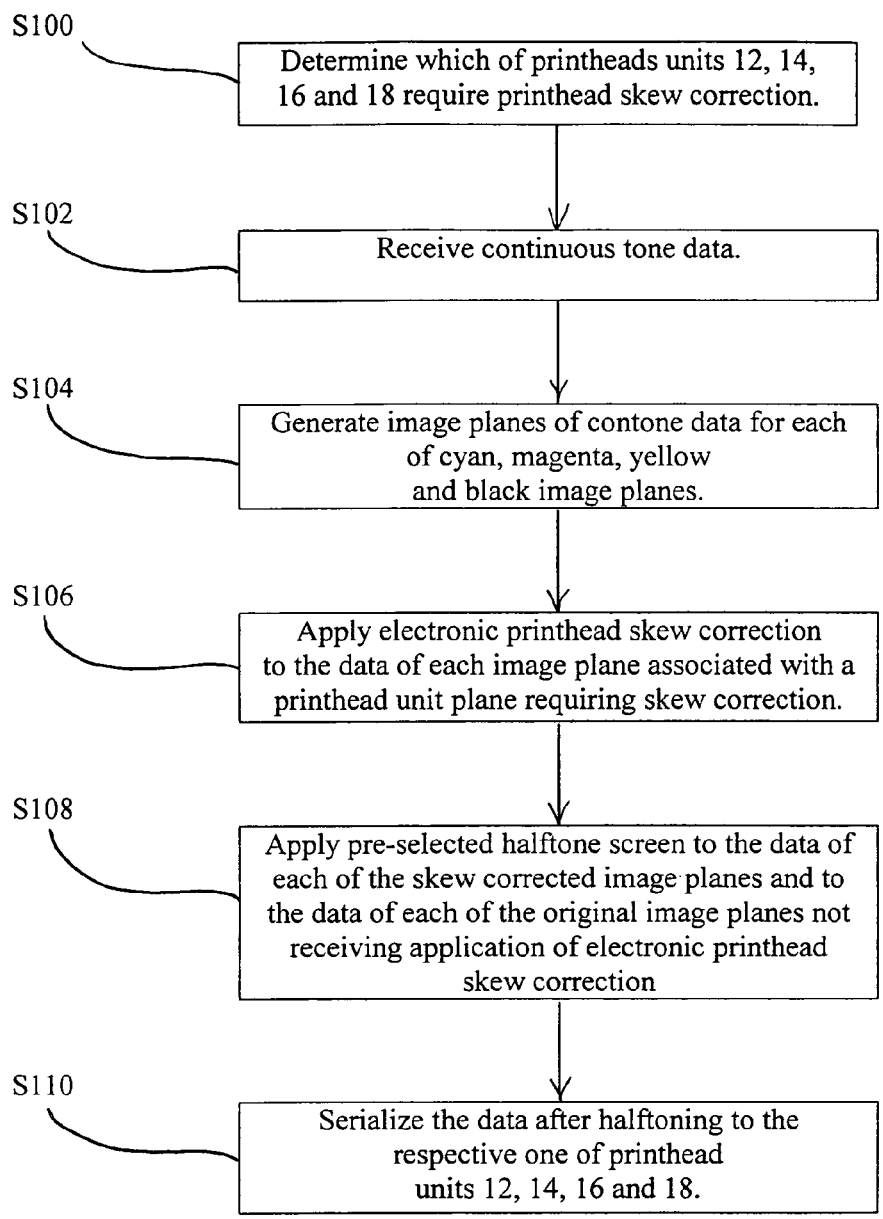
FIG. 5 is a flow chart of a method of the invention for reducing undesirable print artifacts when using electronic printhead skew correction.

As illustrated by the flow chart of FIG. 5, the first anti-artifact technique is to apply the electronic printhead skew correction to the data of the appropriate one or more of the cyan, magenta, yellow and black image planes prior to applying the associated halftone screens. In doing so, the image distortion introduced by the electronic printhead skew correction is diffused by the overlying image distortion generated by application of the halftone screens.

In the flow chart of FIG. 5, at step S100, it is first determined which of printheads units 12, 14, 16 and 18 require printhead skew correction. At step S102, printer 10 receives continuous tone data to be printed. At step S104, the continuous tone image data is separated in the appropriate cyan, magenta, yellow and black image planes for further processing to generate the image bit maps for the cyan, magenta, yellow and black image planes. Based upon the determination made at step S100, at step S106 electronic printhead skew correction is applied to the data, i.e. the bytemap, of each image plane associated with a printhead unit requiring skew correction. Thereafter, at step S108, pre-selected halftone screens (masks) are applied to the data of each of the cyan, magenta, yellow and black image planes. In other words, halftone screens are applied to each skew corrected image bytemap and to each of the original bytemaps not receiving application of electronic printhead skew correction. Then, at step S110, the data of each halftoned image plane is serialized to the respective one of printhead units 12, 14, 16 and 18.

As a result, for each printhead requiring skew correction, the associated halftone screen is not skew corrected, but the underlying image is skew corrected. Thus, the image distortion introduced by the electronic printhead skew correction is diffused by the overlying noise generated by application of the halftone screen. More importantly, however, this technique eliminates visual artifacts caused by the shifting of the halftone screens.

Figure 6:
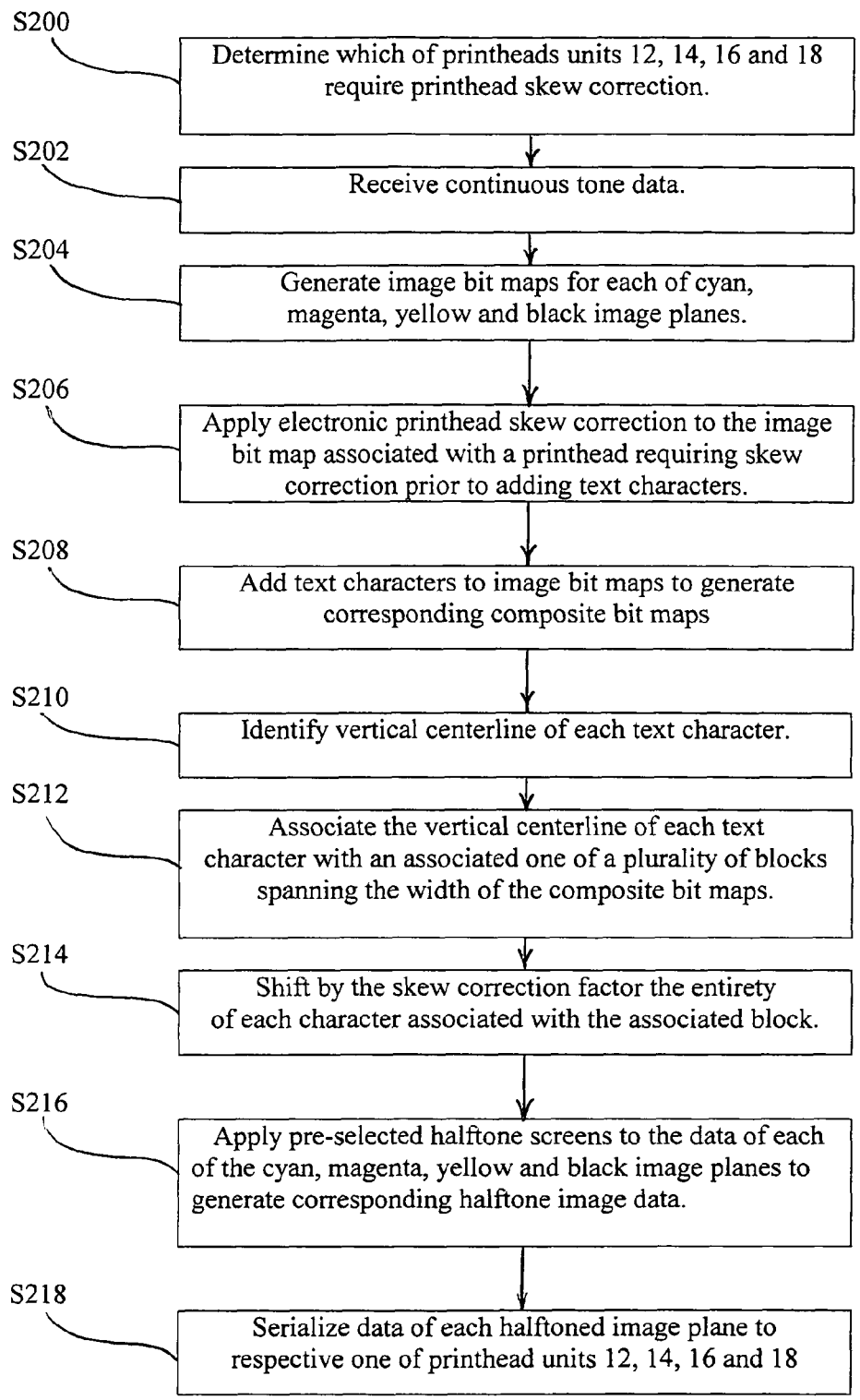
FIG. 6 is a flow chart of an enhancement of the method of FIG. 5 for handling text characters.

In the flow chart of FIG. 6, a second anti-artifact technique, which is a modification of the first technique depicted in FIG. 5, is directed to preventing a single character of text from being subjected to the shifting effects of two skew correction (shift) factors, as can occur if the text character bridges a block boundary between two blocks which will be subjected to different shift factors. At step S200, it is first determined which of printheads units 12, 14, 16 and 18 require printhead skew correction. At step S202, printer 10 receives continuous tone data to be printed. At step S204, the continuous tone image data is separated in the appropriate cyan, magenta, yellow and black image planes for further processing to generate the image bit maps for the cyan, magenta, yellow and black image planes for non-text data. Based upon the determination made at step S200, at step S206 electronic printhead skew correction is applied to the contone data, i.e., the bytemap, of each image plane associated with a printhead unit requiring skew correction prior to adding text. At step S208, text characters are added to image bit maps of one or more of the cyan, magenta, yellow and black image planes to generate corresponding composite bit maps. At step S210, the vertical centerline of each text character is identified. At step S212, the vertical centerline of each text character is associated with one of the plurality of blocks spanning the width of the composite bit maps. At step S214, the entirety of each character is shifted by the skew correction factor associated with the associated block. This effectively shifts any block boundary that would intersect a text character to the space between adjacent text characters. At step S216, pre-selected halftone masks are applied to the data of each of the cyan, magenta, yellow and black image planes to generate corresponding halftone image data. Thereafter, at step S218, the data of each halftoned image plane is serialized to the respective one of printhead units 12, 14, 16 and 18.

In some printing systems, it may be desirable to obtain the results of the techniques described above with respect to FIGS. 5 and 6, but still perform all shifting late in the imaging process. In order to accommodate this desire, the spirit of the techniques described in relation to FIGS. 5 and 6 can be accomplished by pre-compensating the halftoning method to counter the undesirable effects of late process skew correction, as illustrated in FIGS. 7 and 8.

Figure 7:
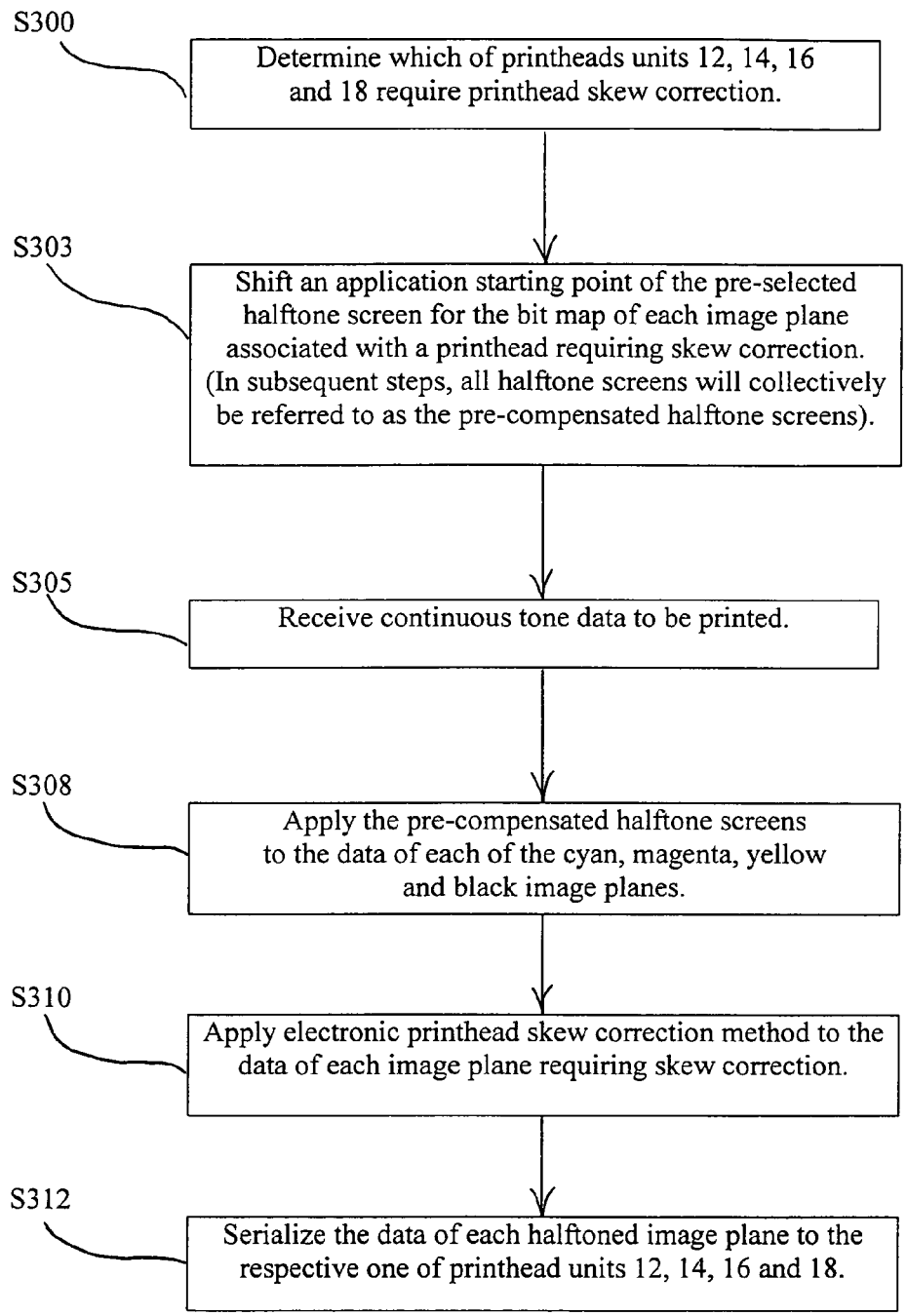
FIG. 7 is a flow chart of an alternative method for obtaining the print artifact reduction results of the method of FIG. 5.

In the pre-compensation technique illustrated by the flow chart of FIG. 7, at step S300, it is first determined which of printheads units 12, 14, 16 and 18 require printhead skew correction. Based upon the determination made at step S300, at step S303 an application starting point of each of the pre-selected halftone screens is shifted in a direction reverse to and at a magnitude equal to the direction and magnitude of the electronic skew correction (skew correction factor) which is to be applied to the bit map of each image plane associated with a printhead requiring skew correction. For printheads that do not require skew correction, no shifting of the application starting point for the associated halftone screen is required. For ease of discussion, at the conclusion of step S303 all halftone screens, i.e., both with and without application start point shifting, will be collectively referred to as pre-compensated halftone screens. At step S305, printer 10 receives continuous tone data to be printed. At step S308, the pre-compensated halftone screens are applied to the data of each of the cyan, magenta, yellow and black image planes. Then, at step S310, electronic printhead skew correction is applied to the data of each image plane associated with a printhead unit requiring skew correction. Thereafter, at step S312, the data of each halftoned image plane is serialized to the respective one of printhead units 12, 14, 16 and 18. As a result, the halftone screen is skewed by the laser printhead skew, but the underlying image is skew corrected.

Figure 8:
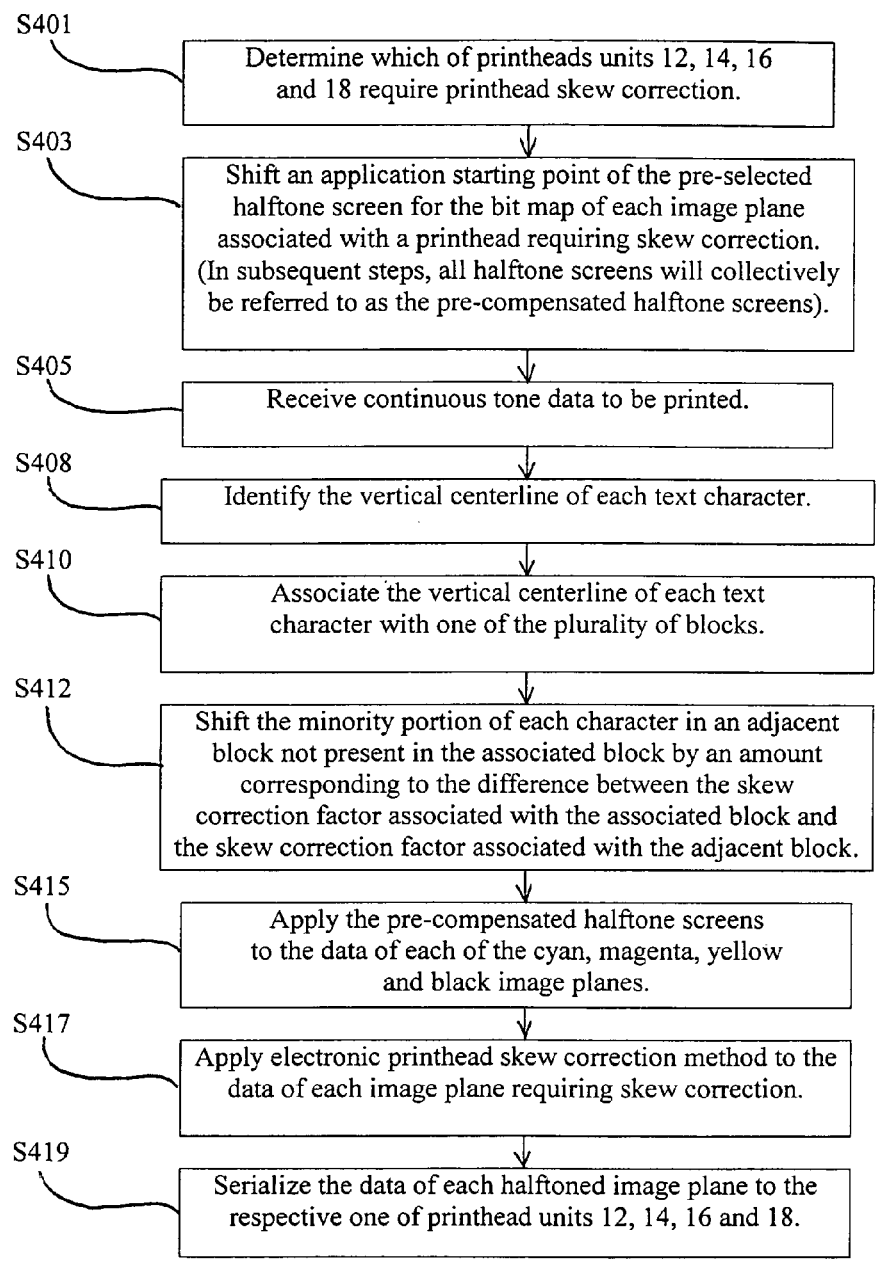
FIG. 8 is a flow chart of an alternative method for obtaining the print artifact reduction results of the method of FIG. 6.

In the pre-compensation technique illustrated by the flow chart of FIG. 8, at step S401, it is first determined which of printheads units 12, 14, 16 and 18 require printhead skew correction. Based upon the determination made at step S401, at step 403 an application starting point of each of the pre-selected halftone screens is shifted in a direction reverse to and at a magnitude equal to the direction and magnitude of the electronic skew correction (skew correction factor) which is to be applied to the bit map of each image plane associated with a printhead requiring skew correction. At step S405, printer 10 receives continuous tone data to be printed. At step S408, the vertical centerline of each text character is identified. At step S410, the vertical centerline of each text character is associated with one of the plurality of blocks spanning the width of the composite bit maps. At step S412, the minority portion of each character in a block adjacent the associated block, i.e., not present in the associated block, is shifted by an amount corresponding to the difference between the skew correction factor associated with the associated block and the skew correction factor associated with the adjacent block. At step S415, the pre-compensated halftone screens are applied to the data of each of the cyan, magenta, yellow and black image planes. Then, at step S417, electronic printhead skew correction is applied to the data of each image plane associated with a printhead unit requiring skew correction. Thereafter, at step S419, the data of each halftoned image plane is serialized to the respective one of printhead units 12, 14, 16 and 18.

The present invention has been described herein as being used in conjunction with a laser printer. However, it is to be understood that it is possible for the present invention to be adapted for use in conjunction with other types of electrophotographic imaging apparatus, such as copying machines. It is further to be understood that it is possible for the present invention to be adapted for use in conjunction with other types of printing technologies.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which falls within the limits of the appended claims.

What is claimed is:

1. A method for reducing the occurrence of print artifacts in an imaging machine, comprising the steps of:
   applying electronic printhead skew correction to image data corresponding to at least one of a plurality of image planes to generate skew corrected image data; and
   applying an associated halftone screen to said skew corrected image to reduce distortion which would be introduced by the use of said associated halftone screen prior to said electronic printhead skew correction.

2. The method of claim 1, further comprising the steps of:
   adding text characters to said skew corrected image data to form a composite bitmap;
   dividing said composite bit map into a plurality of blocks;
   identifying text characters which bridge adjoining of said blocks;
   associating said identified text characters with a respective one of said plurality of blocks; and
   shifting an entirety of said each of said identified text characters by a skew correction factor associated with said respective one of said plurality of blocks.

3. The method of claim 2 in which said shifting is of a minority portion of each text character located in adjoining of said blocks.

4. A method for reducing the occurrence of print artifacts in an imaging machine, comprising the steps of:
   determining which of a plurality of printheads units require printhead skew correction;
   receiving continuous tone data to be printed;
   generating from said continuous tone data a plurality of image bytemaps, each of said plurality of image bytemaps corresponding to a respective one of a plurality of image planes and to a respective one of said plurality of printheads;
   applying electronic printhead skew correction to each image bytemap associated with a printhead unit requiring printhead skew correction to generate a corresponding skew corrected image bytemap;

applying an associated halftone screen to each of said corresponding skew corrected image bytemap and to each of said plurality of image bytemaps not receiving application of electronic printhead skew correction to form corresponding halftoned image data; and serializing each of said corresponding halftoned image data to a respective one of said plurality of printhead units.

5. The method of claim 4, wherein prior to the step of applying an associated halftone screen, said method further comprising the steps of:

adding text characters to at least one of said plurality of image bytemaps to generate at least one composite bytemap;

dividing said composite bytemap into a plurality of blocks;

identifying text characters which bridge adjoining of said blocks;

associating said identified text characters with a respective one of said plurality of blocks; and shifting an entirety of each of said identified text characters by a skew correction factor associated with said respective one of said plurality of blocks.

6. The method of claim 5 in which said shifting is of a minority portion of each text character located in adjoining of said blocks.

7. A method for reducing the occurrence of print artifacts in an imaging machine, comprising the steps of:

determining which of a plurality of printheads units require printhead skew correction;

receiving continuous tone data to be printed;

generating from said continuous tone data a plurality of image bytemaps, each of said plurality of image bytemaps corresponding to a respective one of a plurality of image planes and to a respective one of said plurality of printheads, and wherein at least one of said plurality of image bytemaps includes text characters and said at least one of said plurality of image bytemaps corresponds to a printhead which requires printhead skew correction;

dividing each of said plurality of image bytemaps into a plurality of blocks;

assigning a skew correction factor to each of said plurality of blocks;

identifying characters which bridge adjoining of said blocks;

associating each of said identified text characters with a respective one of said plurality of blocks; and shifting an entirety of each of said identified text characters by said skew correction factor associated with said respective one of said plurality of blocks.

8. The method of claim 7 in which said shifting is of a minority portion of each text character located in adjoining of said blocks.

9. A method for reducing the occurrence of print artifacts in an imaging machine, comprising the steps of:

determining which of a plurality of printheads units require printhead skew correction;

receiving continuous tone data to be printed;

generating from said continuous tone data a plurality of image bytemaps, each of said plurality of image bytemaps corresponding to a respective one of a plurality of image planes and to a respective one of said plurality of printheads;

establishing at least one halftone screen; and for each of said plurality of image planes associated with a printhead requiring printhead skew correction, shifting a starting point of application of said at least one halftone screen to the corresponding image bytemap in a direction opposite to and of a magnitude equal to a shift direction and shift magnitude of an electronic printhead skew correction which is to be applied, applying said at least one halftone screen to said corresponding image bytemap, applying said electronic printhead skew correction to the halftoned image bytemap of the first applying step, and serializing the halftoned image bytemap of the second applying step to the respective one of said plurality of printhead units.

10. A method for reducing the occurrence of print artifacts in an imaging machine, comprising the steps of:

determining which of a plurality of printheads units require printhead skew correction;

receiving continuous tone data to be printed;

generating from said continuous tone data a plurality of image bytemaps, each of said plurality of image bytemaps corresponding to a respective one of a plurality of image planes and to a respective one of said plurality of printheads, and wherein at least one of said plurality of image bytemaps includes text characters and said at least one of said plurality of image bytemaps corresponds to a printhead which requires printhead skew correction;

dividing each of said plurality of image bytemaps into a plurality of blocks;

assigning a skew correction factor to each of said plurality of blocks;

identifying a vertical centerline of each of said text characters;

associating said vertical centerline of said each of said text characters with a respective one of said plurality of blocks;

wherein for each text character bridging a block boundary between an associated block and an adjacent block, performing the step of shifting a minority portion of said each text character located in said adjacent block not present in said associated block by an amount corresponding to a difference between a skew correction factor corresponding to said associated block and a skew correction factor corresponding to said adjacent block; and after said step of shifting, applying electronic printhead skew correction to each image bytemap associated with each said printhead unit which requires said printhead skew correction.

11. The method of claim 10, further comprising the step of applying a halftone screen to said plurality of image bytemaps after the step of applying electronic printhead skew correction.

12. A method for reducing the occurrence of print artifacts in an imaging machine, comprising the steps of:

applying an associated, pre-compensated halftone screen to image data corresponding to at least one of a plurality of image planes to reduce halftone noise introduced by an electronic printhead skew correction; and applying said electronic skew correction to data resulting from said applying said pre-compensated halftone screen.

13. The method of claim 12, further comprising the steps of:

adding text characters to said skew corrected image data to form a composite bit map;

dividing said composite bit map into a plurality of blocks;

identifying text characters which bridge adjoining of said blocks;

associating said vertical centerline of said each of said identified text characters with a respective one of said plurality of blocks; and shifting an entirety of said each of said identified text characters by a skew correction factor associated with said respective one of said plurality of blocks.

\* \* \* \* \*